United States Patent
Cherian et al.

(10) Patent No.: US 9,426,718 B2
(45) Date of Patent: Aug. 23, 2016

(54) SYSTEMS AND METHODS FOR DATA EXCHANGE OVER COMMON COMMUNICATION LINKS

(71) Applicant: Qualcomm Incorporated, San Diego, CA (US)

(72) Inventors: George Cherian, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 13/830,193

(22) Filed: Mar. 14, 2013

(65) Prior Publication Data

US 2013/0308560 A1    Nov. 21, 2013

Related U.S. Application Data

(60) Provisional application No. 61/648,025, filed on May 16, 2012.

(51) Int. Cl.
*H04W 40/12* (2009.01)
*H04W 40/02* (2009.01)
(Continued)

(52) U.S. Cl.
CPC ............ *H04W 40/12* (2013.01); *H04W 40/02* (2013.01); *H04W 76/02* (2013.01); *H04W 4/005* (2013.01); *H04W 48/18* (2013.01); *H04W 76/002* (2013.01); *H04W 76/022* (2013.01); *H04W 76/041* (2013.01)

(58) Field of Classification Search
CPC .............................. H04W 40/12; H04W 40/02

USPC ......................................................... 370/329
See application file for complete search history.

(56) References Cited

U.S. PATENT DOCUMENTS 6,374,112 B1    4/2002  Widegren et al.
7,447,175 B2   11/2008  Shin
(Continued)

FOREIGN PATENT DOCUMENTS

GB        2424547 A       9/2006
JP     2003110498 A       4/2003
(Continued)

OTHER PUBLICATIONS

ITRI: "Resource sharing solution for MTC Groups", 3GPP Draft; S2-103106, 3rd Generation Partnership Project (3GPP), Mobile Competence Centre; 650, Route Des Lucioles; F-06921 Sophia-Antipolis Cedex; France, vol. SA WG2, No. Elbonia; Jul. 6, 2010, Jun. 29, 2010, XP050458194.
(Continued)

*Primary Examiner* — Charles C Jiang
*Assistant Examiner* — Thad Defauw
(74) *Attorney, Agent, or Firm* — Linda G. Gunderson

(57) ABSTRACT

Systems, methods, and devices for network communication of data are described. One method described includes determining a characteristic of data to be communicated. The method includes selecting, via a processor, one of a plurality of communication pathways based at least on the determined characteristic, wherein selecting is independent of an air interface used to communicate the data. The method further includes establishing the selected communication pathway if the selected pathway has not been established. The method further includes communicating the data via the selected communication pathway.

28 Claims, 11 Drawing Sheets

(51) Int. Cl.
*H04W 76/02* (2009.01)
*H04W 4/00* (2009.01)
*H04W 48/18* (2009.01)
*H04W 76/00* (2009.01)
*H04W 76/04* (2009.01)

(56) References Cited

U.S. PATENT DOCUMENTS

| | | | |
|---|---|---|---|
| 7,539,160 | B2 | 5/2009 | Virtanen et al. |
| 7,613,811 | B1* | 11/2009 | Bhalla ............... H04W 80/045 370/331 |
| 2002/0196749 | A1 | 12/2002 | Eyuboglu et al. |
| 2003/0012217 | A1 | 1/2003 | Andersson et al. |
| 2003/0073449 | A1 | 4/2003 | Motegi et al. |
| 2003/0236074 | A1* | 12/2003 | Ishii .................. H04L 25/0218 455/69 |
| 2005/0073969 | A1 | 4/2005 | Hart et al. |
| 2005/0174984 | A1 | 8/2005 | O'Neill |
| 2005/0176422 | A1 | 8/2005 | Choi et al. |
| 2006/0056440 | A1 | 3/2006 | Khartabil |
| 2007/0086339 | A1* | 4/2007 | Briggs ............... H04L 12/5695 370/230 |
| 2007/0109990 | A1* | 5/2007 | Bennett ............. H04L 12/2898 370/328 |
| 2007/0110034 | A1* | 5/2007 | Bennett .................. H04L 45/00 370/352 |
| 2008/0082642 | A1 | 4/2008 | Wu |
| 2009/0129296 | A1 | 5/2009 | Grinshpun et al. |
| 2010/0022216 | A1* | 1/2010 | Bandera ................. H04W 4/24 455/405 |
| 2011/0194510 | A1* | 8/2011 | Gaal ..................... H04L 5/0037 370/329 |
| 2011/0249636 | A1* | 10/2011 | Cherian ............ H04L 29/12801 370/329 |
| 2011/0295956 | A1* | 12/2011 | Pechanec ........... G06Q 30/0206 709/206 |

FOREIGN PATENT DOCUMENTS

| | | |
|---|---|---|
| JP | 2003283525 A | 10/2003 |
| JP | 2006279899 A | 10/2006 |
| WO | 02104046 A1 | 12/2002 |
| WO | 03019973 A2 | 3/2003 |
| WO | 2004077707 A2 | 9/2004 |
| WO | 2006055933 A2 | 5/2006 |
| WO | 2007080549 A1 | 7/2007 |
| WO | 2009078508 A1 | 6/2009 |
| WO | 2011047589 A1 | 4/2011 |
| WO | 2011145602 A1 | 11/2011 |

OTHER PUBLICATIONS

Kddi., et al., "MTC Small Data Transmissions", 3GPP Draft; S1-112400, 3rd Generation Partnership Project (3GPP), Mobile Competence Centre ; 650, Route Des Lucioles; F-06921 Sophia-Antipolis Cedex; France, vol. SA WG1, No. Dublin; Aug. 8, 2011, Aug. 15, 2011, XP050547880.

Mediatek Inc: "MTC small data identification mechanism for non-SMS Small Data Transmission Solution", 3GPP Draft; S2-114341_MTC_Small_Data_Identification, 3rd Generation Partnership Project (3GPP), Mobile Competence Centre; 650, Route Des Lucioles; F-06921 Sophia-Antipolis Cedex; France, vol. SA WG2, No. Jeju Island; Oct. 10, 2011, Oct. 4, 2011, XP050549516.

Samsung: "MTC Group Based Policing", 3GPP Draft; S2-100558-Grouppolicy, 3rd Generation Partnership Project (3GPP), Mobile Competence Centre; 650, Route Des Lucioles; F-06921 Sophia-Antipolis Cedex; France, vol. SA WG2, No. Shenzhen, China; Jan. 18, 2010-Jan. 22, 2010, Jan. 12, 2010, pp. 1-2, XP050630508.

ZTE: "The group bearer for MTC", 3GPP Draft; S2-100094_Group Bearer, 3rd Generation Partnership Project (3GPP), Mobile Competence Centre; 650, Route Des Lucioles; F-06921 Sophia-Antipolis Cedex; France, vol. SA WG2, No. Shenzhen; Jan. 18, 2010, Jan. 12, 2010, pp. 1-2, XP050432722.

ZTE: "The group bearer for MTC", 3GPP TSG SA WG2 Meeting #178, Feb. 22-26, 2010, TD S2-100995, sections 2. 5.1.3.X, 2 pages.

Qualcomm Incorporated; Cherian, George; 1-50 Wang, Jun; Tinnakornsrisuphap, Peerapol: 3GPP2 Network Optimization for M2M, Dec. 6, 2010, XP002650341.

3GPP TSG-RAN Meeting #22, "25.922 Rel-5 CR, Radio Resource handling of streaming traffic class PDP contexts," TSG-RAN WG2, RP-030627, Maui, USA, Dec. 9-12, 2003, pp. 1-5.

* cited by examiner

SYSTEMS AND METHODS FOR DATA EXCHANGE OVER COMMON COMMUNICATION LINKS

CROSS REFERENCE TO RELATED APPLICATIONS

This application claims priority a priority benefit under 35 U.S.C. §119(e) from U.S. Provisional Application No. 61/648,025 filed on May 16, 2012 entitled "SYSTEMS AND METHODS FOR DATA EXCHANGE OVER COMMON COMMUNICATION LINKS" the contents of which are hereby incorporated by reference in their entirety. Any and all priority claims identified in the Application Data Sheet, or any correction thereto, are hereby incorporated by reference under 37 CFR 1.57.

BACKGROUND

1. Field

The present application relates generally to wireless communications, and more specifically to systems, methods, and devices for selecting data communication pathways between network elements for data exchange between a device and a data network.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

As the number and types of devices capable of communicating data via the radio network to the core network, a need exists to perform such communications in an efficient manner.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In an innovative aspect a method of network communication of data is provided. The method includes determining a characteristic of data to be communicated. The method includes selecting, via a processor, one of a plurality of communication pathways based at least on the determined characteristic, wherein selecting is independent of an air interface used to communicate the data. The method further includes establishing the selected communication pathway if the selected pathway has not been established. The method further includes communicating the data via the selected communication pathway.

In another innovative aspect, an apparatus for network communication of data is provided. The apparatus includes a data traffic analyzer configured to generate a value indicating a characteristic of data to be transmitted. The apparatus includes a communication pathway circuit configured to select one of a plurality of communication pathways based at least on the generated value, wherein selecting is independent of an air interface used to communicate the data. The communication pathway circuit is further configured to establish the selected communication pathway if the selected pathway has not been established. The communication pathway circuit is also configured to communicate the data via the selected communication pathway.

In a further innovative aspect, a computer readable storage medium including instructions executable by a processor of an apparatus is provided. The instructions cause the apparatus to determine a characteristic of data to be communicated. The instructions further cause the apparatus to select one of a plurality of communication pathways based at least on the determined characteristic, wherein selecting is independent of an air interface used to communicate the data. The instructions also cause the apparatus to establish the selected communication pathway if the selected communication pathway has not been established. The instructions cause the apparatus to communicate the data via the selected communication pathway.

In a further innovative aspect, another apparatus for network communication of data is provided. The apparatus includes means for generating a value indicating a characteristic of data to be transmitted. The apparatus further includes means for selecting one of a plurality of communication pathways based at least on the generated value, wherein selecting is independent of an air interface used to communicate the data. The apparatus further includes means for establishing the selected communication pathway if the selected communication pathway has not been established and for communicating the data via the selected communication pathway.

In the above innovative aspects, the selected communication pathway may include a pathway between a core network and a radio access node. The plurality of communication pathways may include one or more pathways between an access node and a packet data node. The selected communication pathway may include one of a common communication pathway, such as an A10 connection, and a unicast communication pathway, such as a pathway uniquely assigned for a device.

In the above innovative aspects, the determined characteristic may include one or more of a quantity of data to be communicated, a frequency with which the data will be communicated, the type of data that will be communicated, and an application generating the data that will be communicated. The selection may be based at least in part on a relationship between a characteristic of data to be communicated and a predetermined threshold. The threshold may be determined by a threshold generator. A comparator may be included to compare the value indicating a characteristic of data to be transmitted with a predetermined threshold value.

In some implementations, the selecting is performed by a device and transmitted to the network such as to a radio access node via, for example, link control signal or an air interface signal.

In some implementations, quality of service may be determined for the selected communication pathway based on a value included in a packet transmitted via the communication pathway. For example, the value may include a packet header value associated with a service provider. The quality of service may be provided by a machine-to-machine interworking framework (e.g., upon request, provisioned in advance, etc.).

Figure 1:
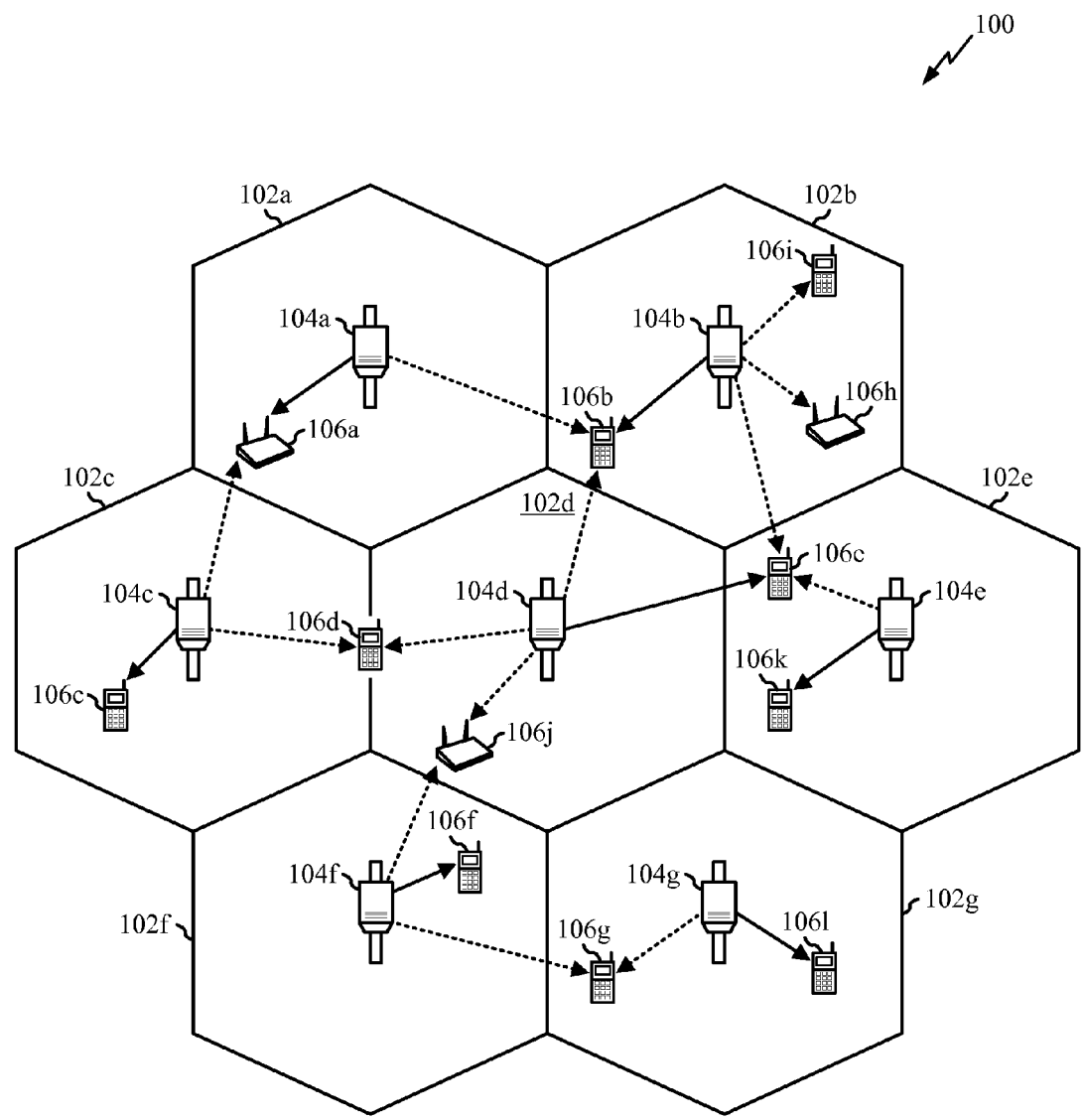
FIG. 1 illustrates an example of a wireless communication network in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

As discussed above, radio technologies may be configured to provide access to a core network, such as a data network. The network may include a common connection between the radio access node (RAN) and the core network (e.g. packet data network or packet switched data network (PSDN)) which devices associated with the RAN can use to access the data network. In some implementations, this may be referred to as a common A10 connection. This connection is common because, in some implementations, the connection may be used by the network to support interactions with the data network for multiple devices.

The common connection may be contrasted with a dedicated connection. A dedicated connection, in some implementations, may be allocated for communications between the RAN and the core network for a specific device associated with the RAN. In some implementations, the dedicated connection may be referred to as a per-AT A10 connection or a unicast A10 connection. In implementations where the A10 connection is shared by a group of related devices, the connection may be referred to as a multicast A10 connection.

Setting up a dedicated connection typically involves the utilization of various resources (e.g., processing, air-time, bandwidth, power, and the like) as signals are exchanged with various network entities to securely establish the communication link. In some implementations, the device which may be communicating the data may be providing a limited quantity of information. For example, a smart utility meter may be configured to transmit a packet including a few bytes of data such as a meter reading. As such, the expense of setting up a dedicated connection may be significant when compared to the amount of data that will be transmitted. Furthermore, as the number of dedicated connections established between the RAN and the core network increases, the quantity of resources (e.g., power, processing, bandwidth) expended to manage and maintain these connections increases. This can impact, sometimes negatively, the performance of the RAN, the core network, and the associated devices.

Providing a mechanism to request the use of a common connection for certain data transmissions may thus prove beneficial. In some implementations, the use of the common connection may be initiated by the data network or upon request from the device associated with the RAN (e.g., an user equipment). In either case, the overhead of setting up, and eventually breaking down, a dedicated connection may be avoided. Furthermore, the number of dedicated connections which the RAN and core network maintain may be reduced thereby further improving overall network performance and/or resource utilization.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

Furthermore, in the following description, for reasons of conciseness and clarity, terminology associated with the UMTS systems is used. It should be emphasized that the disclosed techniques may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a wireless communication network or system 100 in which aspects of the present disclosure may be employed. The wireless communication network 100 may operate pursuant to a wireless standard, for example the LTE Advanced standard, LTE standard, WiMax standard, GSM standard, EDGE standard, 802.11 standard, WiFi Advanced-N standard, and so forth. The wireless communication system 100 may include an access point (AP) 104, which communicates with stations (STAs) 106.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a smart meter or other machine-to-machine wireless communication device, a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with W-CDMA or CDMA techniques. If this is the case, the wireless communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may be configured as a base station and provide wireless communication coverage in a basic service area (BSA) 102. Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
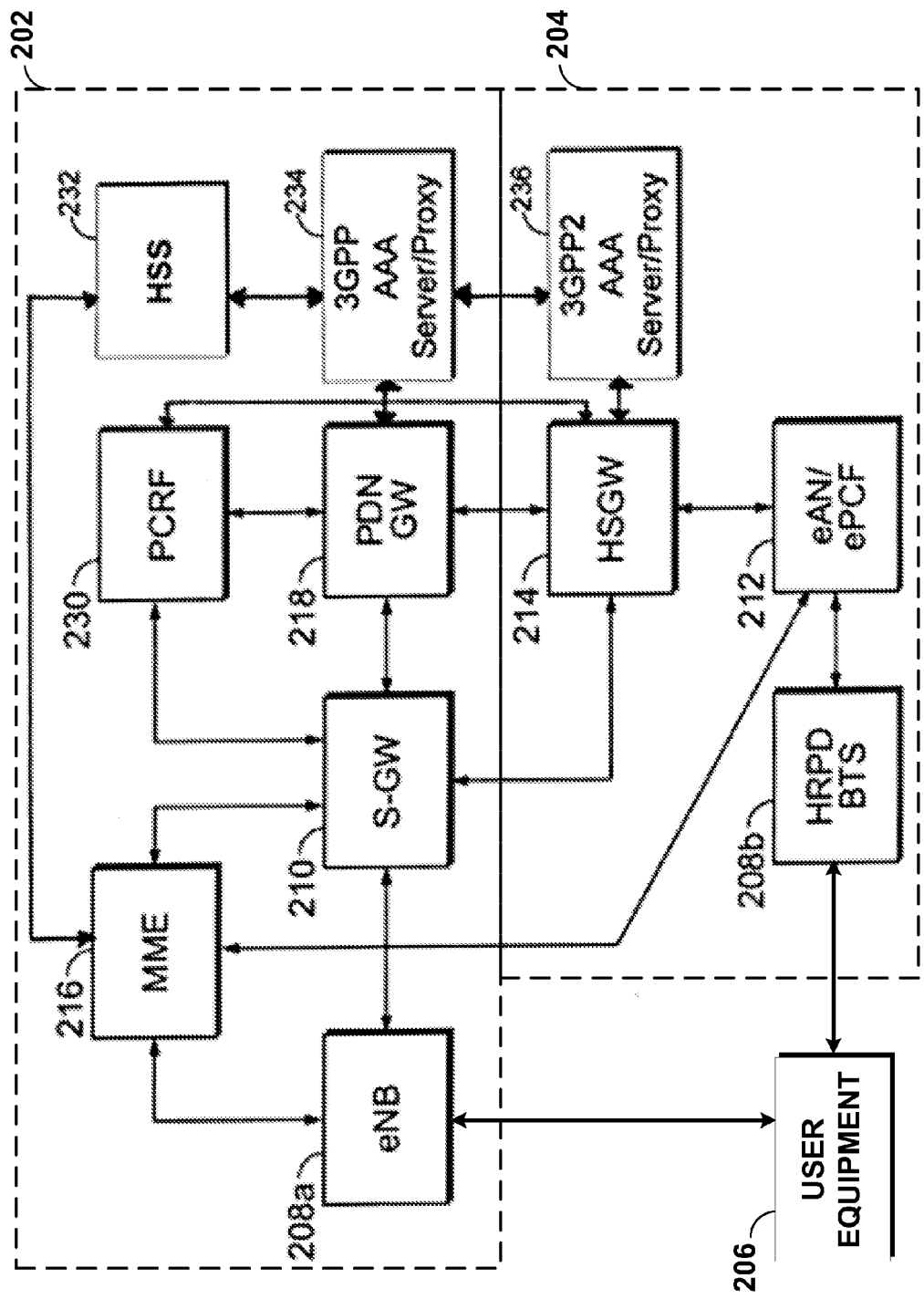
FIG. 2 illustrates an example of a functional block diagram of certain communication entities of the wireless communication network of FIG. 1.

FIG. 2 illustrates an example of a functional block diagram of certain communication entities of the wireless communication network of FIG. 1. The components shown in FIG. 2 illustrate a system in which a multimode or multiband device may communicate using multiple radio access technologies (RATs), for example an eHRPD network, an LTE network, etc. depending on the configuration of the network in the location in which the mobile device is currently operating. As FIG. 2 illustrates, the system 200 may include a radio access network RAN 202 that provides wireless radio communications between a UE 206 and an eNodeB 208a (e.g., a Node B, base station, access point, etc.) using LTE radio access technology. The system also depicts a RAN 204 which provides wireless radio communications between a UE 206 and a eHRPD base transceiver station (BTS) 208b (e.g., a Node B, base station, access point etc.) using eHRPD radio access technology. For simplicity of discussion, FIG. 2 depicts a UE 206 and one eNodeB 208a in a RAN and one HRPD BTS 208b in another RAN; however, it is to be appreciated that each RAN may include any number of UEs and/or eNodeBs/HRPD BTSs. In addition, it is to be appreciated that additional RANs may be included, such as UTRA, GSM, EDGE, and so forth.

In accordance with one aspect, the eNodeB 208a and HRPD BTS 208b may transmit information to a UE 206 over a forward link or downlink channel and a UE 206 can transmit information to the eNodeB 208a and HRPD BTS 209b over a reverse link or uplink channel. As shown, RANs can utilize any suitable type of radio access technology such as, but not limited to, LTE, LTE Advanced, HSPA, CDMA, HRPD, eHRPD, CDMA2000, GSM, GPRS, EDGE, UMTS, or the like.

The RANs, and specifically the eNodeB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks. The RANs and core network can communicate via an S1 interface, for instance. The core network can include a mobility management entity (MME) 216 that can be an end-point for control signaling from the RAN. The MME 216 can provide functions such as mobility management (e.g., tracking), authentication, and security. The MME 216 can communicate with the RANs via the S1. The core network can also include a serving gateway (S-GW) 210 which is a user plane node that connects the core network to the LTE RAN. The core network may also include a HRPD serving gateway (HSGW) 214 which connects the core network to the eHRDP RAN. The eHRDP RAN also includes an evolved access node (eAN) and an evolved packet control function (ePCF) entity 212 which manages the relay of packets between the HRPD BTS 208b and the HSGW 214.

Furthermore, the HSGW 214 and the S-GW 210 may communicate to facilitate interoperability between the eHRPD network and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, a PDN GW 218 and the core network.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface. While illustrated as separate nodes in FIG. 2, it is to be appreciated that the S-GW 210 and PDN GW 218, for example, can be configured to operate as a single network node to reduce user plane nodes in core network. In one aspect, the core network may also include a 3GPP authentication, authorization and accounting (AAA) server/proxy 234 and a 3GPP2 AAA server/proxy 236 which many communicate with each other and further communicate with the PDN GW 218 and the HSGW 214 respectfully. The core network may also include a home subscriber services (HSS) entity 232 which may communicate with the MME 216 and the 3GPP AAA server/proxy 234. In some implementations, the path between the PDN GW 218 and the UE 206 may be referred to as a packet data network connection. A packet data network connection may be identified by one or more network (e.g., IP) addresses.

The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

Figure 3:
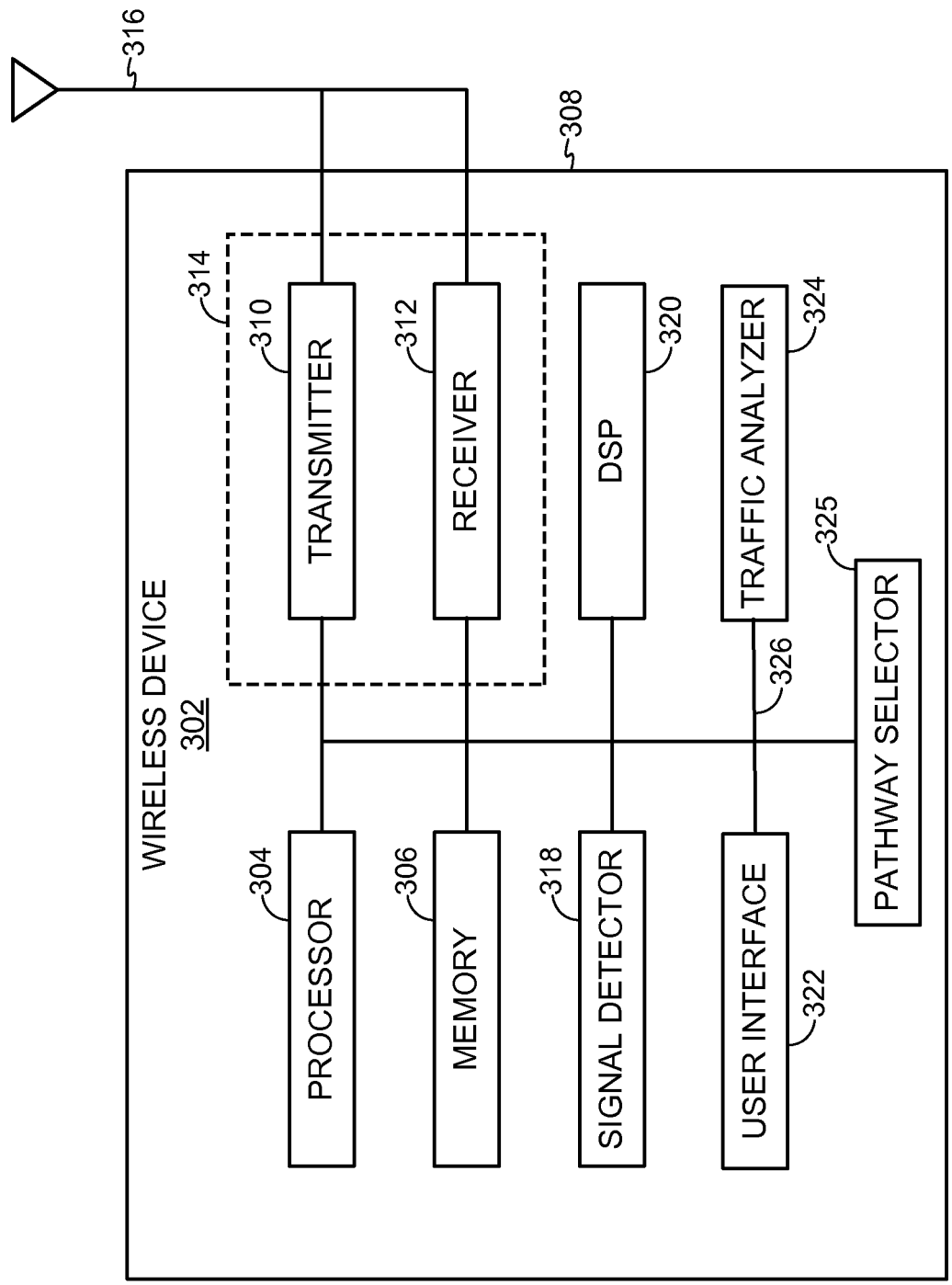
FIG. 3 illustrates an example of a functional block diagram of a wireless device that may be employed within the wireless communication network of FIG. 1.

FIG. 3 illustrates an example of a functional block diagram of a wireless device that may be employed within the wireless communication network of FIG. 1. The wireless device 302 is an example of a device that may be configured to implement the various methods described herein. For example, the wireless device 302 can comprise a STA, a UE, an AT, a subscriber station, a subscriber unit, a mobile station, a remote station, a remote terminal, a user terminal, a user agent, a user device, etc. As another example, the wireless device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the wireless device 302 (e.g., through an interface 322, SIM card, download, over the air). The processor 304 may perform logical and arithmetic operations further based on the configuration data.

In some aspects, the processor 304 is configured to cause signals to be sent and receive signals from another device (e.g., AP 104, STA 106, etc.). The signals may include connection signals indicating the type of connection that may be used for a particular transmission for the device 302.

For example, in some implementations, the device 302 may be configured to transmit/receive small packets of data. Based on the transmission characteristic information, the processor 304 may cause transmission of a signal indicating the use of a common connection for transmitting such small packets. When the device 302 is implemented as an AP 104, the signal may be generated, for example, by a packet data serving node for one or more previously registered devices or a class of devices. The methods of AP 104 driven selection are described in further detail below. When the device 302 is implemented as an STA 106, the signal may be generated prior to or during the link control protocol requesting procedures. The methods of STA 106 driven selection are described in further detail below.

In some implementations such as when wireless device 302 is implemented as an AP, the processor 304 may be configured to enforce the access permissions. For example, if a device indicated as not permitted to access the AP attempts to acquire an unavailable data communication pathway, the processor 304 may cause the acquisition to fail.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that includes the transmitter 310 and/or the receiver 312 to allow transmission and reception of data between the wireless device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals. The DSP 320 may be configured to generate a packet for transmission and/or process a received packet.

In some aspects, the wireless device 302 may further comprise a user interface 322. The user interface 322 may comprise a keypad, a microphone, a speaker, and/or a display. The user interface 322 may include any element or component that conveys information to a user of the wireless device 302 and/or receives input from the user.

The wireless device 302 may include a traffic analyzer 324. The traffic analyzer 324 may be configured to generate one or more values indicating a characteristic of data to be transmitted. For example, the wireless device may be a smart utility meter. A meter reading may be generated, for example, by the processor 304. Prior to transmission, the traffic analyzer 324 may determine a characteristic of the meter reading to be transmitted. The traffic analyzer 324 may generate a value indicating the quantity of data to be transmitted. For example, the traffic analyzer 324 may determine the number of bytes to be transmitted. The traffic analyzer 324 may be configured to determine how frequently the meter readings are transmitted. For example the traffic analyzer 324 may track a history of meter readings over time. The traffic analyzer 324 may then generate a value indicating how often data is transmitted. The traffic analyzer 324 may be configured to detect a type of data to be transmitted. For example, a smart meter reading may include a few bites of integer data. In other applications, the data to be transmitted may be audio, video, or multimedia data. The type of data may also indicate the importance of the information. For example, in a cellular device which is included in an automobile, routine maintenance information may be considered low importance while an indication of a traffic accident (E.G., airbag deployed) may be more critical. The traffic analyzer 324 may be configured to identify an application generating the data to be transmitted. A wireless device 302 may include one or more applications which may generate and or receive data. By identifying the application associated with the data, the traffic may be analyzed.

The values generated by the traffic analyzer 324 may be stored in the memory 306. The values may be accessed by a pathway selector 325. The pathway selector may be configured to select a communication pathway for the data to be transmitted. In some implementations, the pathway selector 325 may be configured to select between a common data communication pathway and a dedicated data communication pathway. The pathway selector 325 may be configured to compare one or more characteristics provided by the traffic analyzer 324 to select the appropriate data communication pathway. For example, the pathway selector 325 may be configured to select the common data communication pathway if the number of bytes to be transmitted is less than a predetermined threshold. The threshold may correspond to a relatively small data transmission. The threshold may be provided by the network operator. For example, the threshold may be provisioned over the air via signaling with the network. The threshold may be stored in the memory 306 or dynamically determined based on one or more characteristics of the device, the network, or the like. In some implementations, the pathway selector 325 may be configured to compare a characteristic of the data to a range. If the characteristic value falls within the range, an appropriate selection may be made. As with the threshold, the range may be provisioned in a variety of ways.

The pathway selector 325 may be configured to select a data communication pathway by signaling via the network. The pathway selector 325 may be configured to select a data communication pathway from an STA. The pathway selector 325 may be configured to select a data communication pathway from a non-STA network component such as an access point, a RAN, or a PDSN. The pathway selector 325 may be configured to select a data communication pathway through one or more of the call flows described in further detail below.

The various components of the wireless device 302 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the terms "circuit" and "circuitry" are construed as a structural terms and not as functional terms. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the wireless device 302 may also be implemented as a combination of computing devices, e.g., a combination of a DSP and a microprocessor, a plurality of microprocessors, one or more microprocessor in conjunction with a DSP communication, or any other such configuration.

In some wireless cellular system, the dedicated data link such as PDN connection/S1 tunnel in an LTE system or PPP/Per-UE A10 connection in a cdma2000 system may be established so that user data can be exchanged between the UE and the network/server. In some implementations, this may not be an efficient use of an air interface and network resources because the UE and network may be configured to use additional signaling to establish the dedicated data link and the UE and network need to maintain per-UE state. This additional signaling may consume air time, processing time, battery, and other device and network resources. Accordingly, use of a common communication pathway may conserve resources by allowing multiple devices to share the pathway.

To be able to use the common data link shared by different UEs, the system may be configured to setup a common data link and switch between the common data link and dedicated link. The system may be further configured to manage policy and enforcement parameters to switch between the common data link and dedicated link. In some implementations, the system may be configured to provide a secure common data link. The system may be configured to control quality of service for a common data link. The system may be configured to meter the common data link, such as use-based counting and charging, when common data link is used for communicating data.

Figure 4:
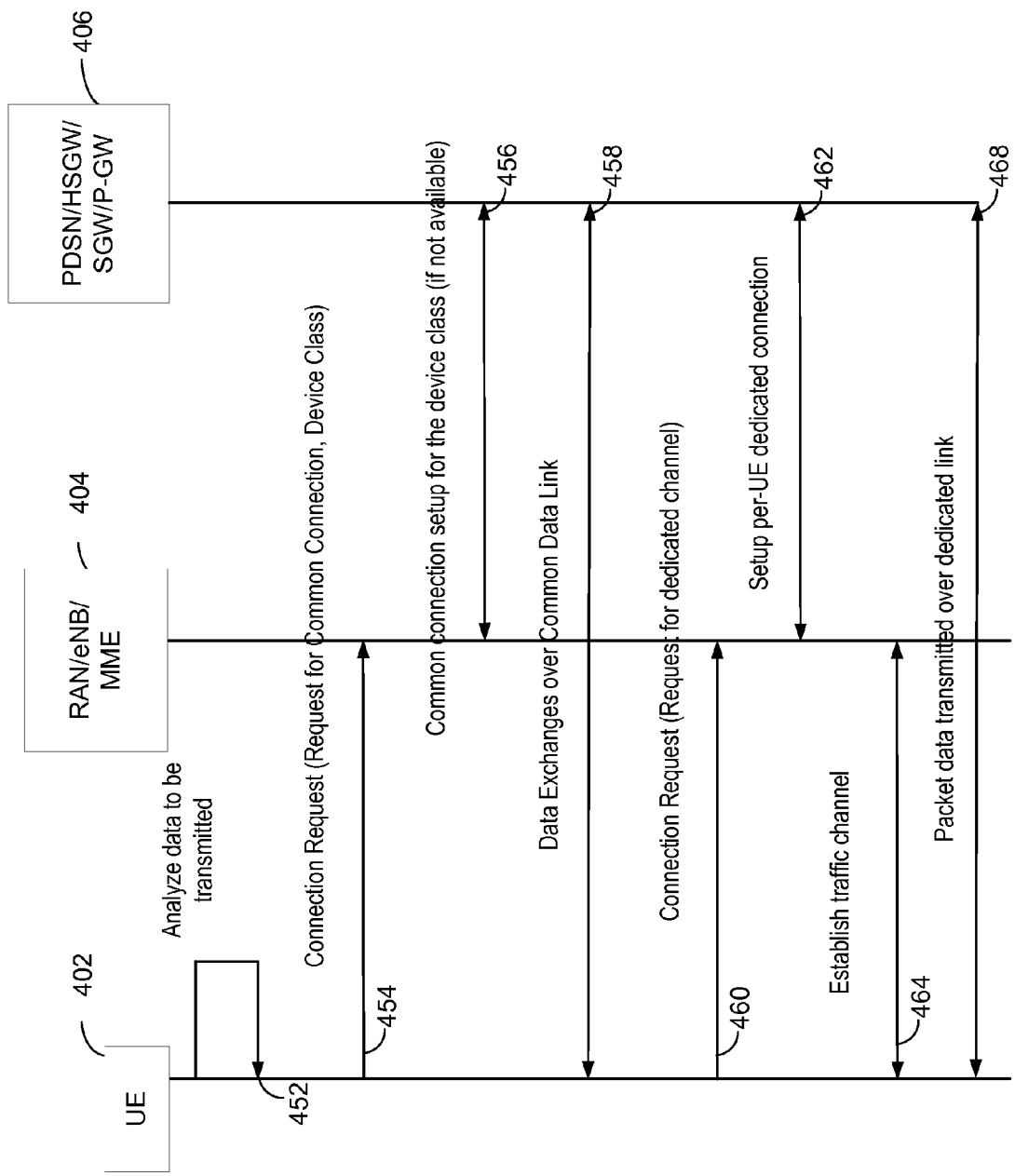
FIG. 4 illustrates a call flow diagram of an example of user equipment-initiated selection of a data communication pathway.

FIG. 4 illustrates a call flow diagram of an example of user equipment-initiated selection of a data communication pathway. The call flow diagram shown in FIG. 4 includes some of the entities which may be included in a wireless communication system according to the described systems and methods. The entities shown in FIG. 4 include a UE 402 a radio access network/enhanced NodeB/mobility management entity (RAN/eNB/MME) 404 and a packet data serving node/HRPD serving gateway/serving gateway/PDN-gateway (PDSN/HSGW/SGW/P-GW) 406.

Call 452 indicates the analysis result for data to be transmitted as described above. In some implementations, the analysis may be performed based on the data to be transmitted. The UE 402 may be configured to communicate with the RAN/eNB/MME 404 via a common or dedicated air interface. If the data to be communicated is the first transmission, there may not be an air interface established for the UE 402. In some implementations, UE 402 may already be associated with the RAN/eNB/MME 404. In such implementations, the RAN/eNB/MME 404 may have established a dedicated communication pathway (e.g., unicast connection) during an existing communication session to the PDSN/HSGW/SGW/P-GW 406. The analysis may consider a characteristic of the existing data transmitted via the dedicated pathway. For example, the service transmitting data to the UE 402 may include header information identifying the end of a data exchange. As such, the dedicated pathway may not be necessary for subsequent signaling. In such case, use of a common pathway may be desirable.

In the configuration shown in FIG. 4, the UE 402 via call 454 may transmit a packet connection request to the RAN/ eNB/MME 404. The packet connection request may include a value indicating a common data communication pathway is requested. The packet connection request may include one or more values identifying the device, application, device class, or application class communicating the data. In some implementations, call 454 may include a link control protocol configure request transmitted over established dedicated data communication pathway.

Based on the information included in the packet connection request, the RAN/eNB/MME 404 may identify a common communication pathway. In some instances, a common pathway associated with the identified device/application and/or class may be established between the RAN/eNB/MME 404 and the PDSN/HSGW/SGW/P-GW 406. In such instances, this common pathway may be used for subsequent communications. As shown in FIG. 4, the RAN/eNB/MME 404 may be configured to transmit a request 456 to set up a common data communication pathway with the HSGW/PDSN/SGW/P-GW 406. The UE 402 may begin transmitting data via the common data communication pathway via call 458.

As part of the communication via call 458, the HSGW/PDSN/SGW/P-GW 406 may be configured to send a message to establish a traffic channel for the UE 402 to the RAN/eNB/MME 404. The RAN/eNB/MME 404 may transmit the signal to the UE 402 to establish a traffic channel with the user equipment 402. In some implementations, if a characteristic of the data transmitted changes, the UE 402 and/or HSGW/PDSN/SGW/P-GW 406 may be configured to switch the communication to a dedicated data communication pathway. For example if the amount of data exceeds a predetermined threshold, the HSGW/PDSN/SGW/P-GW 406 may request the RAN/eNB/MME 404 to use a dedicated data communication pathway for the UE 402 by sending a message 460 to the RAN/eNB/MME 404. The RAN/eNB/MME 440 may set up the per-UE dedicated connection to the HSGW/PDSN/SGW/P-GW 406 for the UE 402 via message 462. The RAN/eNB/MME 404 may be configured to page the UE 402 to setup a traffic channel via call 464. In some implementations, the HSGW/PDSN/SGW/P-GW 406 may request one or more devices transmitting data via the common data communication pathway to switch to a dedicated communication pathway. The UE 402 may thus utilize a dedicated data communication pathway with the HSGW/PDSN/SGW/P-GW 406 and exchange data via call 468.

As can be seen in FIG. 4 (and will be further illustrated in the figures that follow), the air interface which is used by the UE 402 to communicate with the RAN/eNB/MME 440 does not necessarily influence the selection of the communication pathway that will be set up between the RAN/eNB/MME 404 and the HSGW/PDSN/SGW/P-GW 406 for data communicated by/to the UE 402. Accordingly, the UE 402 may be utilizing a dedicated (e.g., unicast) channel to communicate with the RAN/eNB/MME 440 while a common pathway, such as an A10 path, may be used to communicate data for the UE 402 between the RAN/eNB/MME 404 and the HSGW/PDSN/SGW/P-GW 406. Conversely, the UE 402 may utilize a common channel to communicate with the RAN/eNB/MME 440 which in turn establishes a dedicated (e.g., unicast) pathway with the HSGW/PDSN/SGW/P-GW 406 for the UE 402. It will be appreciated that the path between the UE 402 and the RAN/eNB/MME 440 may be of similar type (e.g., dedicated or common) as is used for the UE 402 between the RAN/eNB/MME 404 and HSGW/PDSN/SGW/P-GW 406. However, the selection of the communication pathway between the RAN/eNB/MME 440 and HSGW/PDSN/SGW/P-GW 406 may be independent of an air interface used to communicate the data, depending instead on a characteristic of the data to be transmitted.

Figure 5:
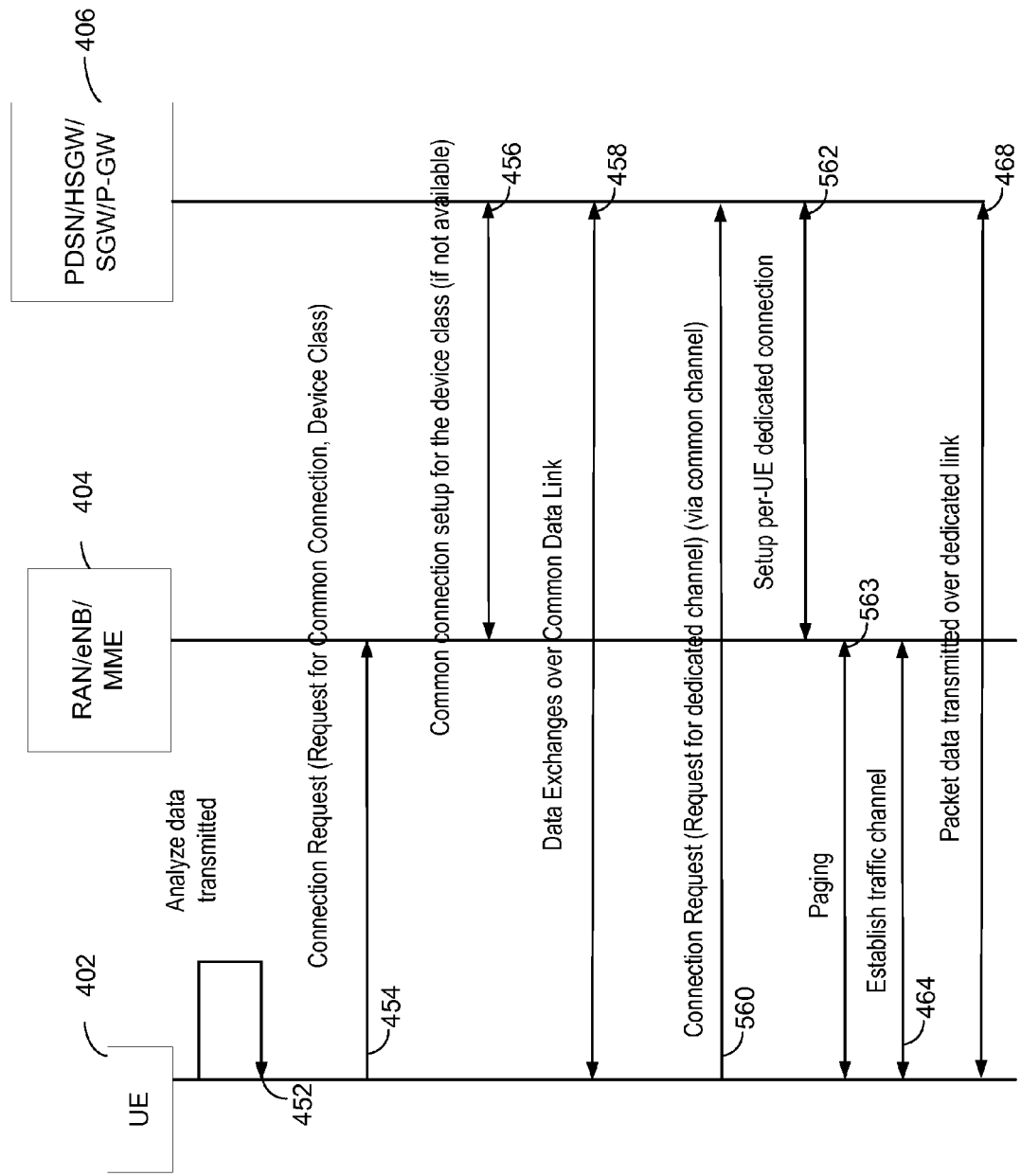
FIG. 5 illustrates a call flow diagram of another example of an user equipment-initiated selection of a data communication pathway.

FIG. 5 illustrates a call flow diagram of another example of an user equipment-initiated selection of a data communication pathway. The call flow diagram shown in FIG. 5 includes some of the entities which may be included in a wireless communication system according to the described systems and methods. The entities shown in FIG. 5 are similar to those shown in FIG. 4.

The call flow begins similarly to the call flow shown in FIG. 4. The common data link is established between the UE 402 and the HSGW/PDSN/SGW/P-GW 406 via call 452, call 454, request 456, and call 458. The call 458 may use a common channel or a dedicated traffic channel for communication between the UE 402 and RAN/eNB/MME 404. If a dedicated traffic channel is used at the call 458, then, the call 460 will cause the switching of the communication path from a common communication path (the call 456) to per-UE communication path (call 462)—in this case, the call 464 of establishing traffic channel between the UE and RAN/eNB/MME 404 is not needed.

In FIG. 5, the UE 402 may request a dedicated communication pathway via call 560. The request may be based on analysis by the UE 402 or based on a message received from the HSGW/PDSN/SGW/P-GW 406. In the configuration shown in FIG. 5, the UE 402 may transmit a message 560 requesting the use of the common data communication pathway for packet data. The message 560 may be transmitted via an air interface signal (e.g., a connection request). The message 560 may be transmitted via a common or dedicated air interface from the UE 402 to the RAN/eNB/MME 404. The RAN/eNB/MME 404 may subsequently utilize the common data communication pathway to propagate the message 560 to the HSGW/PDSN/SGW/P-GW 406.

The connection request may be followed by signal 562 requesting set up of a dedicated packet connection between the RAN/eNB/MME 404 and the HSGW/PDSN/SGW/P-GW 406 for the UE 402. As described above, in some implementations, this may include an LCP configure request transmitted over a dedicated data link to request common data link set up. Paging message 563 may be transmitted from the RAN/eNB/MME 404 to the UE 402 to indicate the establishment of the dedicated connection. The paging message 563 may include information identifying the established communication pathway. Based on the paging message 563, the UE 402 may establish a traffic channel as described above via call 464 and communicate with the HSGW/PDSN/SGW/P-GW 406 via call 468.

As discussed above, if a characteristic of the data session changes, the UE 402 and/or HSGW/PDSN/SGW/P-GW 406 may be configured to switch to a dedicated data communication pathway.

Figure 6:
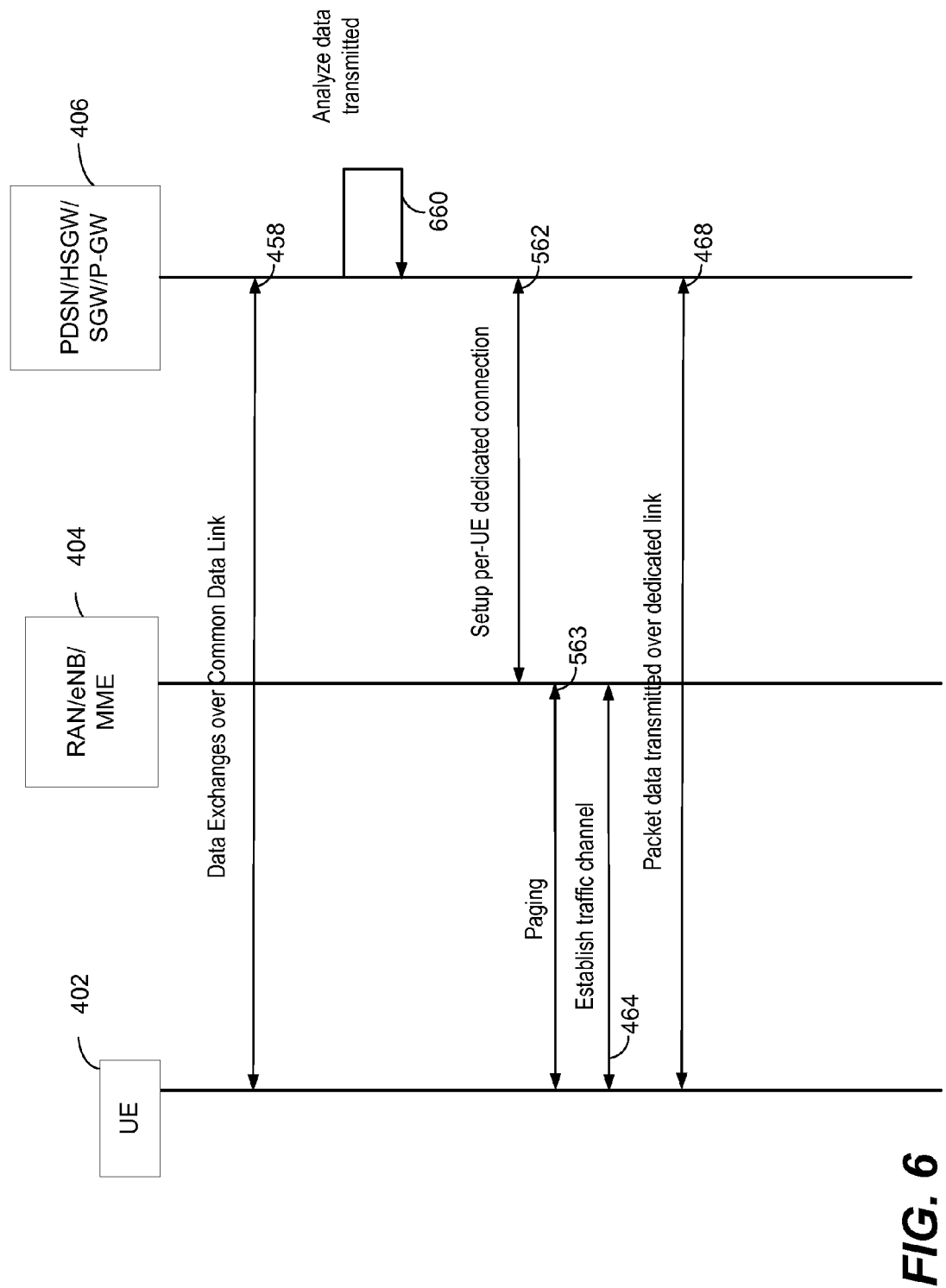
FIG. 6 illustrates a call flow diagram of an example of a network-initiated selection of a data communication pathway.

FIG. 6 illustrates a call flow diagram of an example of a network-initiated selection of a data communication pathway. The call flow diagram shown in FIG. 6 includes some of the entities which may be included in a wireless communication system according to the described systems and methods. The entities shown in FIG. 6 are similar to those shown in FIG. 4. However, unlike FIGS. 4 and 5, FIG. 6 illustrates the selection of a data communication pathway by the HSGW/PDSN/SGW/P-GW 406 rather than the UE 402.

The UE 402 may be communicating via a common data link via call 458 as described above. In FIG. 6, the HSGW/PDSN/SGW/P-GW 406 may analyze one or more characteristic of the data to or from one or more UEs (e.g., aggregate quantity, per UE quantity, header information, and the like). Call 660 indicates the result of the analysis. The analysis may be based on the device class which the HSGW/PDSN/SGW/P-GW 406 anticipates. The analysis may indicate a per-UE connection is appropriate for communicating with a particular UE 402. For example, if the UE 402 is identified as a machine-to-machine device, the HSGW/PDSN/SGW/P-GW 406 may anticipate regular, but small, data transmissions from the UE 402. As another example, the UE 402 may be identified as a voice and data device which may indicate to the HSGW/PDSN/SGW/P-GW 402 that this UE 402 may communicate higher volumes of data. Call 562, paging message 563, call 464, and call 468 may be transmitted as described above. Note, however, as shown in FIG. 6, the UE 402 may not perform an analysis of the data to select/change pathways. Instead, the UE 402 may initiate the packet connection based on the received selection from the HSGW/PDSN/SGW/P-GW 406. Note that the call 464 may be included if a traffic channel was not used between the UE 402 and the RAN/eNB/MME 404 for communicating the call 458.

Figure 7:
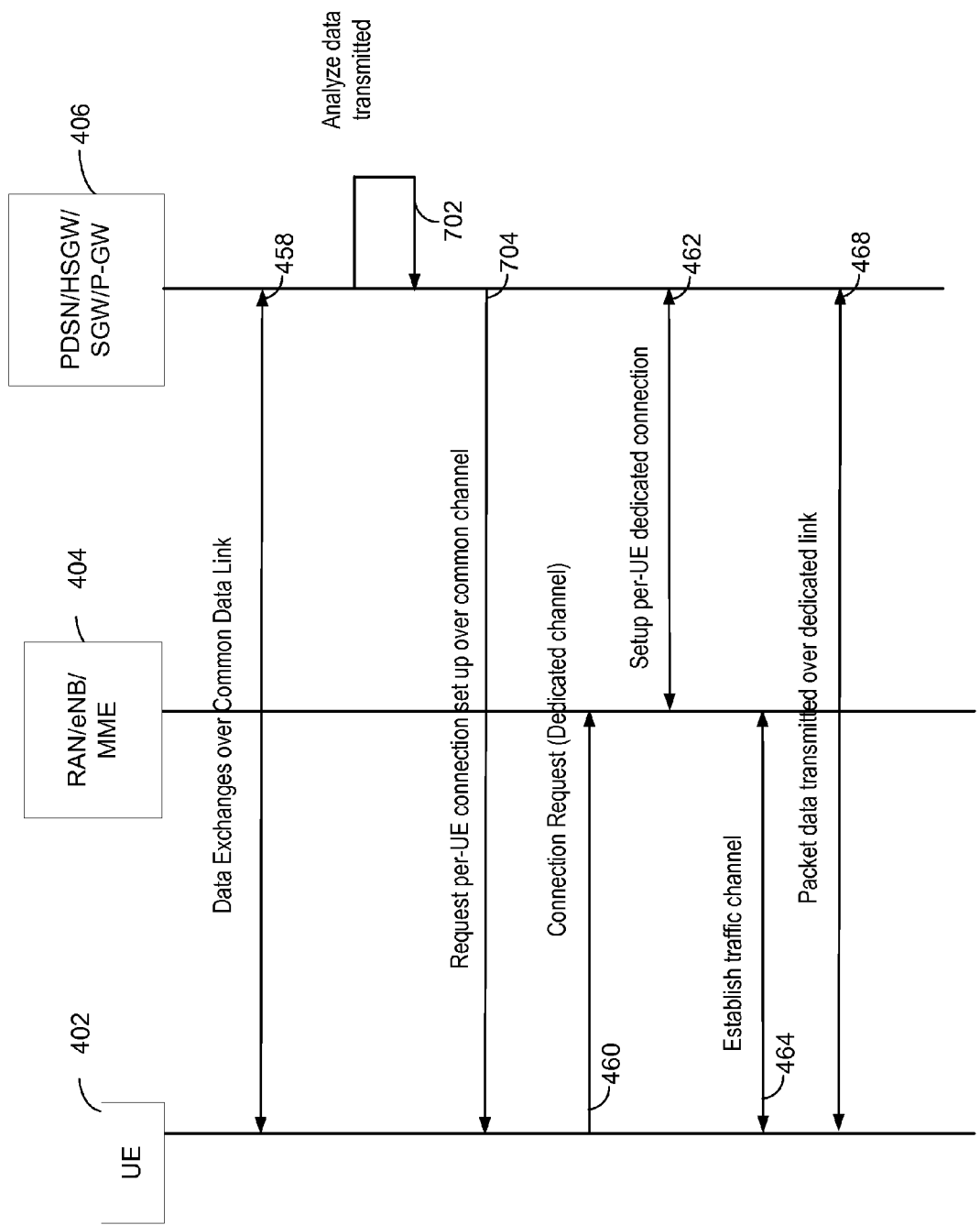
FIG. 7 illustrates a call flow diagram of another example of a user equipment initiated selection of a data communication pathway.

FIG. 7 illustrates a call flow diagram of another example of a network-initiated selection of a data communication pathway. The call flow diagram shown in FIG. 7 includes some of the entities which may be included in a wireless communication system according to the described systems and methods. The entities shown in FIG. 7 are similar to those shown in FIG. 4. Like FIG. 6, FIG. 7 illustrates a network initiated selection of a data communication pathway.

The UE 402 may be communicating via a common data link via call 458 as described above. In FIG. 6, the HSGW/PDSN/SGW/P-GW 406 may analyze one or more characteristic of the data to or from one or more UEs (e.g., aggregate quantity, per UE quantity, header information, and the like). Call 702 indicates the result of the analysis. The analysis may be based on the device class which the HSGW/PDSN/SGW/P-GW 406 anticipates, such as those described above with reference to FIG. 6. Message 704 may be transmitted from the HSGW/PDSN/SGW/P-GW 406 to the UE 402 to initiate a packet connection. In some implementations this message 704 may be an LCP configure request. The UE 402 may initiate the switch to a dedicated communication pathway as described above via message 460, message 462, call 464, and call 468. Note, however, as shown in FIG. 7, the UE 402 may not perform an analysis of the data to select/change the communication pathway. The UE 402 may initiate the paging request and packet connection based on the received selection from the HSGW/PDSN/SGW/P-GW 406.

As described thus far, the communication pathway has switched from a common communication pathway to a dedicated pathway. In some implementations, the techniques described above may be used to switch a data communication pathway from unicast to common pathway. For example, in a network driven implementation, the PDSN may trigger the switch from unicast to common pathway. The PDSN may transmit a signal to the UE indicating the data may be in a dormant state for a configurable period of time. In a UE driven implementation, the UE may be configured to indicate to the network a switch from a unicast to a common pathway before entering a dormant state. By these implementations, the resources that may be used to maintain a dedicated communication pathway may be freed while maintaining a low-overhead data pathway if needed.

Figure 8:
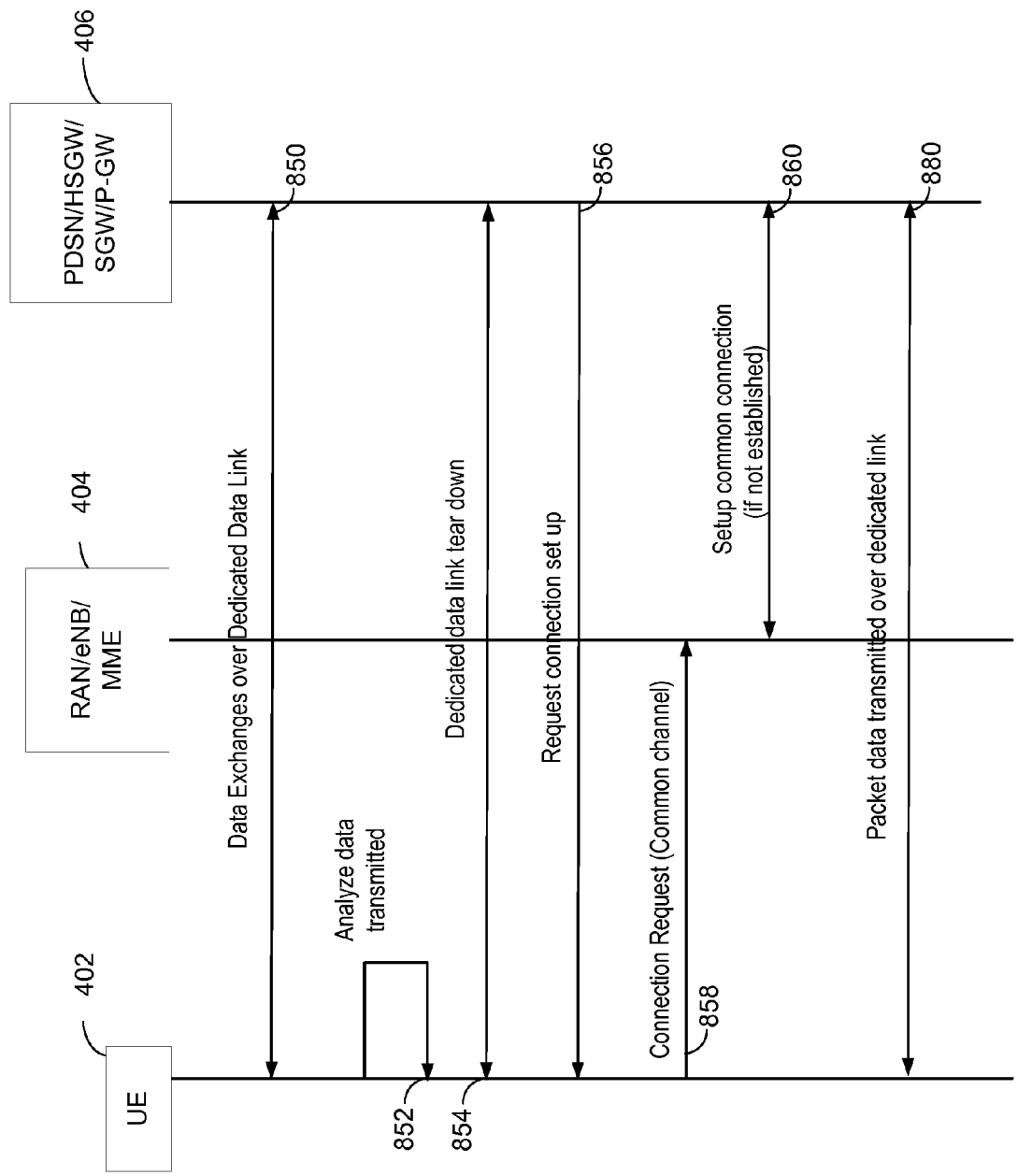
FIG. 8 illustrates a call flow diagram of another example of a network-initiated selection of a data communication pathway.

FIG. 8 illustrates a call flow diagram for a further example of a user equipment-initiated selection of a data communication pathway, selecting a common pathway. The call flow diagram shown in FIG. 8 includes some of the entities which may be included in a wireless communication system according to the described systems and methods. The entities shown in FIG. 8 are similar to those shown in FIG. 4.

The UE 402 may be transmitting data with the HSGW/PDSN/SGW/P-GW 406 via call 850. Call 852 indicates the result of an analysis of data transmitted. As discussed above, the analysis may be of data previously transmitted or to be transmitted. Furthermore, the analysis may be based on an aggregation of data for the device or an application associated with the device. The analysis may consider characteristics such as the type, quantity, and/or frequency of data. For example, if the UE 402 is a smart meter, the meter may have transmitted the last byte of meter data and may not need the dedicated communication pathway until its next monthly reading. Accordingly, the UE 402 may decide to initiate tear down of the dedicated communication path.

Based at least in part on the call 852, message 854 may be transmitted from the UE 402 to initiate the tearing down of the dedicated communication path. Message 856 may be transmitted from the HSGW/PDSN/SGW/P-GW 406 requesting a per-UE connection to be set up over the common channel. The UE 402, having determined the use of a common communication pathway to be sufficient may be configured to transmit message 858 to the RAN/eNB/MME 404 requesting a connection over the common communication pathway. The connection request may include, as discussed above, device and/or application identifiers along with class identifiers for the device/application associated with the data. The message 858 may include a value indicating the requested pathway type as a common data communication pathway. As described above, the RAN/eNB/MME 404 may be configured to set up the common data communication pathway if one does not exist that is associated with the request. The set up may be performed via message 860. Once set up, the UE 402 may transmit data via message 880 as described above.

Figure 9:
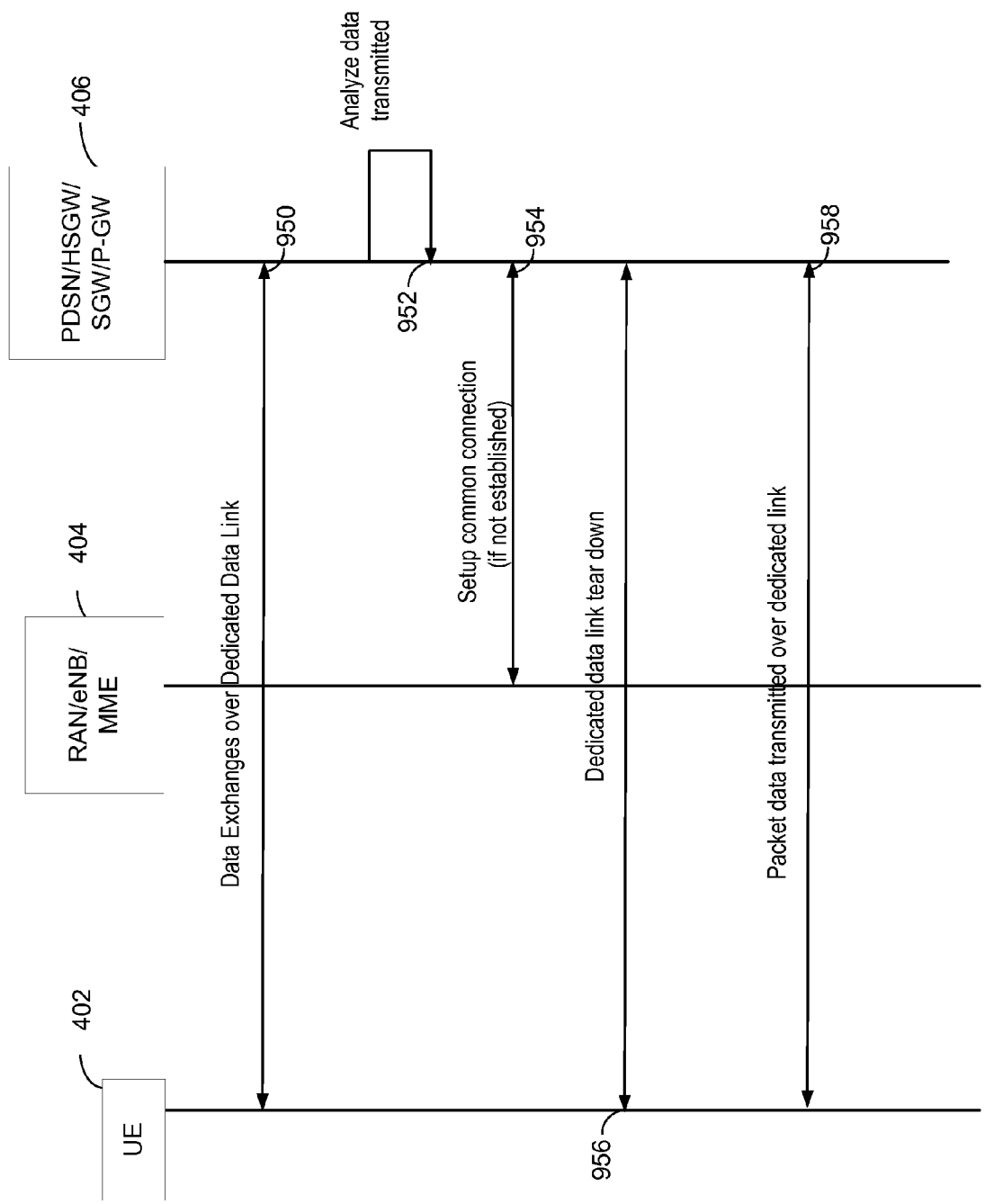
FIG. 9 illustrates a call flow diagram for a further example of a network-initiated selection of a data communication pathway.

FIG. 9 illustrates a call flow diagram for a further example of a network-initiated selection of a data communication pathway, selecting a common pathway. The call flow diagram shown in FIG. 9 includes some of the entities which may be included in a wireless communication system according to the described systems and methods. The entities shown in FIG. 9 are similar to those shown in FIG. 4.

The UE 402 may be transmitting data with the HSGW/PDSN/SGW/P-GW 406 via message 950. Message 952 indicates the result of an analysis of data transmitted. In FIG. 9, the HSGW/PDSN/SGW/P-GW 406 may be configured to perform a similar analysis as described above to identify an appropriate data communication pathway. Based at least in part on the message 952, the HSGW/PDSN/SGW/P-GW 406 may transmit message 954 to establish a common data communication pathway. In some implementations, the HSGW/PDSN/SGW/P-GW 406 may determine whether the pathway exists and, if so, omit message 954.

Message 956 may be transmitted to tear down the dedicated data communication pathway between the UE 402 and the HSGW/PDSN/SGW/P-GW 406. Using one or more of the techniques described above the switch may be provided to the UE 402. Once tear down is complete, the UE 402 may continue communicating with the HSGW/PDSN/SGW/P-GW 406 via message 958 over the common data communication pathway.

As part of any one of the call flows illustrated in FIG. 4, 5, 6, 7, 8, or 9 different communication pathways may be established between an access node and a packet data serving node for different classes of devices and or quality of service levels. The network may be configured to determine a quality of service class. As a PPP connection may not be established, IP filtering of data transmitted via the common communication pathway may be resource intensive. As an alternative, the quality of service class may be derived by the packet data serving node from an explicit indication by an interworking framework (e.g., M2M-IWF) included in a header of the data transmitted. In some implementations a custom tunnel with specified quality of service characteristics may be established between the packet data serving node and the interworking framework for each quality of service class. The common communication pathways, such as common A10 connections, may be assigned based on the quality of service levels. For example, several devices of the same class may be assigned a common communication pathway with a specific quality of service level.

The quality of service information may be provided to the access node. The access node may be configured to apply different priority in scheduling based on the quality of service information associated with the common data communication pathway. The scheduling may include altering paging, traffic channel utilization, and the like. In some implementations, the quality of service information may be indirectly communicated to the RAN based on the quality of service levels for each common communication pathway (e.g., common A10 connection).

As part of any one of the call flows illustrated in FIG. 4, 5, 6, 7, 8, or 9 it may be desirable to obtain usage statistics for devices accessing the network. For example, the number of packets sent via a common data communication pathway may be stored in a memory. The information may be stored based on the device class utilizing the common data communication pathway. The class of device may be associated with a subscriber. On a per application basis, the device may be allowed to request a lower level of service than is associated with subscriber. The application level priority may be indicated in the header of the packet transmitted. Accordingly, a network operator may differentially process packets based on whether they are sent in common data communication pathways or dedicated communication pathways. For example, an operator may have different charging policies based on whether the packets are sent via a common data communication pathway.

The data communicated between the user equipment 402 and the packet data serving node 406 as shown in the call flows in FIG. 4, 5, 6, 7, 8, or 9 may be secure. The security may be provided by RAND level authentication such as access channel MAC layer packet authentication code (AC-PAC) based authentication. In some implementations, extensible authentication protocol (EAP) and/or extensible re-authentication protocol (ERP) may be used. In such implementations, the short data to be sent over the common data communication pathway may be signed/protected by a re-authentication message key (rMSK).

A re-authentication message key may be used to securely handle communication from one packet data serving node to another packet data serving node when communicating via a common data communication pathway. If the context for the communication may be transferred, the RMS can be the also be transferred. If the context cannot be transferred, the extensible re-authentication protocol procedures may be triggered.

Figure 10:
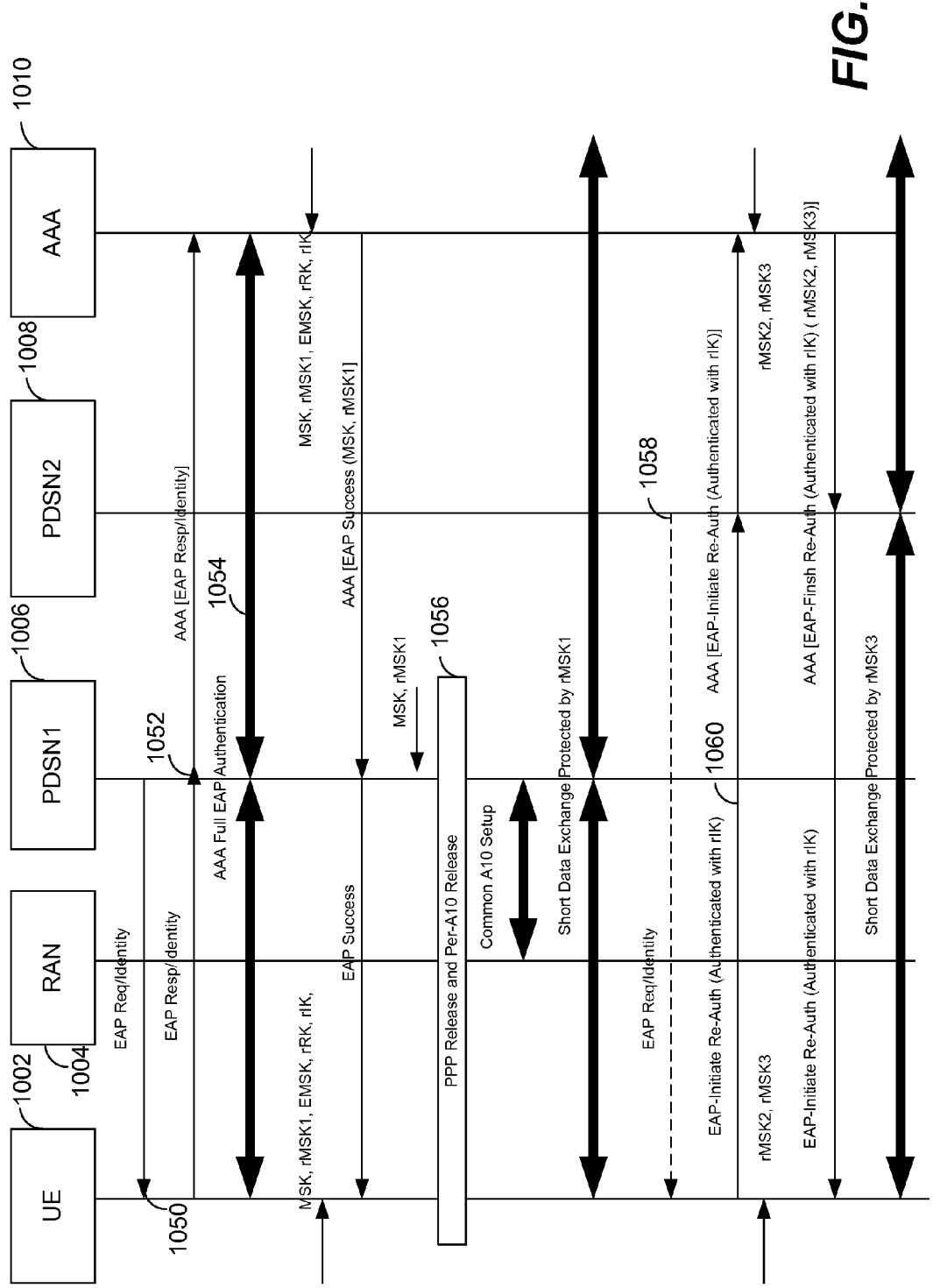
FIG. 10 illustrates a call flow diagram for an example of secure common data communications.

FIG. 10 illustrates a call flow diagram for an example of secure common data communications. The call flow shown in FIG. 10 includes some of the entities which may be included in a wireless communication system according to the described systems and methods. The entities shown in FIG. 10 include a UE 1002, a RAN 1004, a current PDSN (PDSN1) 1006, a target PDSN (PDSN2) 1008, and an AAA server 1010.

A first signal 1050 may be transmitted from the current PDSN 1006 to the UE 1002 requesting authentication. The UE 1002 may transmit a response including identity information via signal 1052. The current PDSN 1006 may be configured to transmit this information to the AAA server 1010. If the provided information is authenticated, full EAP authentication may be established via signal 1054. The UE 1002 and the AAA server 1010 may generate keys that can be used to secure data exchanges between the UE 1002 and the current PDSN 1006. Some key information may be provided to the PDSN 1006.

Having completed authentication, at signal 1056, the PPP connection and dedicated data communication pathway between the user equipment 1002 and the current PDSN 1006 may be released. At a later time, the RAN 1004 may establish a common data communication pathway as described above. The user equipment 1002 may transmit data via the common data communication pathway, protected by the generated key information.

If the user equipment 1002 moves, a new packet data serving node may service the data associated with the user equipment 1002. As part of the so-called handoff procedure, the target PDSN 1008 may transmit signal 1058. The signal may include an EAP request for identity information. Via signal 1060, the user equipment 1002 may initiate re-authentication using a generated key. Additional re-authentication keys may be generated by the user equipment 1002 and the AAA 1010. The additional keys may be provided to the target PDSN 1008. The short data exchange to the target PDSN 1008 may now be protected using one of the additional keys. Accordingly, the communications via the common data communication pathway may be secured.

Figure 11:
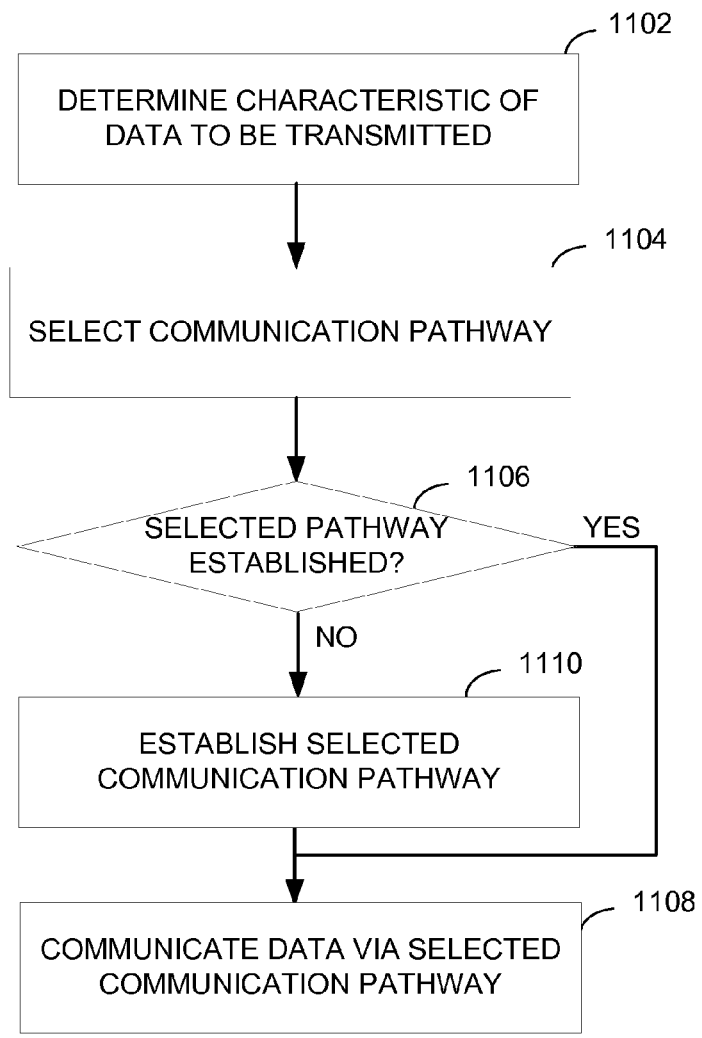
FIG. 11 illustrates process flow diagram of an exemplary method of network communication of data that may be employed within the wireless communication network of FIG. 1.

FIG. 11 illustrates process flow diagram of an exemplary method of network communication of data that may be employed within the wireless communication network of FIG. 1. The method shown in FIG. 11 may be implemented in whole or in part, in a communication device, such as that as shown in FIG. 3 above or FIG. 12 below. The method may be used network communication of data between network elements such as between a RAN and a PDSN. At block 1102, a characteristic of the data to be transmitted is determined. At block 1104, one of a plurality of communication pathways based at least on the determined characteristic, wherein selecting is independent of an air interface used to communicate the data. The communication pathway may be selected from between a common data communication pathway and a dedicated data communication pathway. At decision block 1106, a determination is made as to whether the selected communication pathway has been established. If so, at block 1108, the data is communicated via the selected communication pathway. Returning to decision block 1106, if the selected pathway has not been established, at block 1110, the selected communication pathway is established. Establishing the communication pathway may include initiating a common communication pathway and/or initiating a device specific unicast communication pathway. Once the selected communication pathway is established, at block 1108, the data is communicated via the selected communication pathway.

Figure 12:
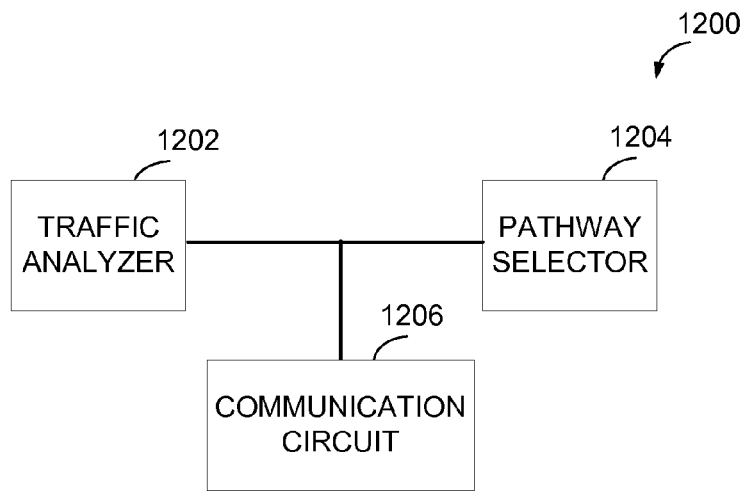
FIG. 12 illustrates a functional block diagram of another exemplary wireless communication device that may be employed within the wireless communication network of FIG. 1.

FIG. 12 illustrates a functional block diagram of another exemplary wireless communication device that may be employed within the wireless communication network of FIG. 1. The wireless communication device shown may be configured for network communication of data between network elements such as a RAN and a PDSN. The exemplary wireless communication device 1200 may be configured to implement one or more of the methods and/or call flows, in whole or in part, as described above.

Those skilled in the art will appreciate that a wireless communication device may have more components than the simplified wireless communication device 1200 shown in FIG. 12. The wireless communication device 1200 shown includes only those components useful for describing some prominent features of certain implementations. The wireless communication device 1200 includes a traffic analyzer 1202, a pathway selector 1204, and a communication circuit 1206.

In some implementations, the traffic analyzer 1202 may be configured to generating a value indicating a characteristic of data to be transmitted. The traffic analyzer 1202 may include one or more of a processor, a comparator, and a memory. In some implementations, means for generating a value indicating a characteristic may include the traffic analyzer 1202.

In some implementations, the pathway selector 1204 may be configured to select one of a plurality of communication pathways based at least on the generated value, wherein selecting is independent of an air interface used to communicate the data. The pathway selector 1204 may include one or more of a processor, a comparator, and a memory. In some implementations, means for selecting one of a plurality of communication pathways may include the pathway selector 1204.

As shown in FIG. 12, the communication circuit 1206 included in the wireless communication device 1200 may be configured to establish the selected communication pathway if the selected communication pathway is not already established. The communication circuit 1206 may further communicate the data via the selected communication path. The communication circuit 1206 may include one or more of a transmitter, a receiver, a memory, a processor, a signal generator, an antenna, and a network interface. In some implementations, means for establishing the selected communication pathway and for communicating the data may include the communication circuit 1206.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of network communication of data between a user equipment (UE) and one or more devices of a core network through a radio access node, wherein the UE and the radio access node communicate using an air interface, the method comprising:
    determining a characteristic of data communicated between a first device and a second device, wherein the first device is the UE or a device of the core network and the second device is the other of the UE or the device of the core network;
    selecting, independent of the air interface via a processor of the first device, one of a common communication pathway and a unicast communication pathway between the device of the core network and the radio access node as a selected communication pathway based at least on the determined characteristic, wherein the common communication pathway comprises a secure common A10 connection which is securely shared by multiple devices, and further wherein the unicast communication pathway comprises a Packet Data Network (PDN) connection/S1 tunnel or a Point to Point Protocol (PPP)/Per-UE A10 connection which is uniquely assigned for communications between the first device and the second device;
    transmitting an indication of the selected communication pathway to the second device,
    wherein if the selected communication pathway has not been established, the method further comprises:
    establishing the selected communication pathway between the first device and the second device; and
    communicating additional data via the selected communication pathway between the first device and the second device.

2. The method of claim 1, wherein the determined characteristic comprises one or more characteristics selected from the group consisting of a quantity of data communicated, how frequently the data will be communicated, a type of data communicated, and an application generating the data communicated.

3. The method of claim 1, wherein selecting is based at least in part on a relationship between the characteristic of data communicated and a predetermined threshold.

4. The method of claim 1, wherein the second device comprises the device of the core network and the first device comprises the UE.

5. The method of claim 4, wherein the indication is transmitted by the UE as part of a link control signal.

6. The method of claim 4, wherein the indication is transmitted by the UE as part of data communication signal.

7. The method of claim 1, wherein the second device comprises the UE and the first device comprises the device of the core network.

8. The method of claim 1, further comprising:
    identifying a value included in a packet transmitted via the selected communication pathway; and
    assigning a quality of service for the selected communication pathway based at least in part on the identified value.

9. The method of claim 8, wherein the value comprises a packet header value associated with a network operator.

10. The method of claim 8, wherein the quality of service is provided by a machine-to-machine interworking framework.

11. The method of claim 1, further comprising:
    maintaining a value for packets associated with a network operator communicated via the selected communication pathway, the value indicative of a quantity of data communicated for the network operator.

12. The method of claim 11, further comprising:
    comparing the value maintained with a threshold quantity for the network operator; and
    altering the selected communication pathway based on the comparison.

13. The method of claim 1, wherein selecting a common data communication pathway comprises selecting one of a plurality of common data communication pathways having different quality of service levels, the selecting based at least in part on a quality of service associated with a device transmitting the data.

14. An apparatus for network communication of data between a user equipment (UE) and one or more devices of a core network through a radio access node, wherein the UE and the radio access node communicate using an air interface, the apparatus comprising:
    a data traffic analyzer configured to generate a value indicating a characteristic of data communicated between a first device and the apparatus, wherein the first device is the UE or a device of the core network and the apparatus is the other of the UE or the device of the core network;

a communication pathway circuit coupled with the data traffic analyzer and configured to select, independent of the air interface, one of a common communication pathway and a unicast communication pathway between the device of the core network and the radio access node as a selected communication pathway based at least on the generated value, wherein the common communication pathway comprises a secure common A10 connection which is securely shared by multiple devices, and further wherein the unicast communication pathway comprises a PDN connection/S1 tunnel or a PPP/Per-UE A10 connection which is uniquely assigned for communications between the first device and the second device;

a transmitter configured to transmit an indication of the selected communication pathway to the first device; and a network communication circuit coupled with the communication pathway circuit and configured to:

if the selected communication pathway has not been established, establish the selected communication pathway between the first device and the apparatus; and communicate additional data via the selected communication pathway between the first device and the apparatus.

15. The apparatus of claim 14, wherein the characteristic of data comprises one or more of characteristics selected from the group consisting a quantity of data transmitted, how frequently the data will be transmitted, a type of data transmitted, and an application generating the data transmitted.

16. The apparatus of claim 14, wherein the communication pathway circuit comprises a comparator configured to compare the value indicating the characteristic of data communicated with a predetermined threshold value.

17. The apparatus of claim 16, further comprising a threshold generator coupled with the communication pathway circuit and configured to periodically generate the predetermined threshold value based at least in part on a characteristic of the apparatus.

18. The apparatus of claim 14, wherein the apparatus comprises the UE and the first device comprises the device of the core network.

19. The apparatus of claim 18, wherein the value is transmitted as part of a link control signal.

20. The apparatus of claim 18, wherein the value is transmitted as part of data communication signal.

21. The apparatus of claim 14, wherein the data traffic analyzer is further configured to identify a value included in a packet transmitted via the selected communication pathway, and wherein the communication pathway circuit is further configured to assign a quality of service for the selected communication pathway based at least in part on the identified value.

22. The apparatus of claim 21, wherein the value is a packet header value associated with a network operator.

23. The apparatus of claim 21, further comprising a quality of service circuit configured to receive quality of service information from a machine-to-machine interworking framework.

24. The apparatus of claim 14, further comprising:

a metering circuit configured to maintain a value for packets associated with a network operator communicated via the selected communication pathway, the value indicative of a quantity of data communicated for the network operator.

25. The apparatus of claim 24, wherein the communication pathway circuit is further configured to:

compare the value maintained with a threshold quantity for the network operator; and alter the selected communication pathway based on the comparison.

26. The apparatus of claim 14, wherein the plurality of communication pathways comprise one or more pathways between an access node and a packet data node of the core network.

27. The apparatus of claim 14, wherein selecting a common data communication pathway comprises selecting one of a plurality of common data communication pathways having different quality of service levels, the selecting based at least in part on a quality of service associated with a device transmitting the data stored in a memory.

28. A non-transitory computer readable storage medium including instructions executable by a processor of an apparatus for network communication of data between a user equipment (UE) and one or more devices of a core network through a radio access node, wherein the UE and the radio access node communicate using an air interface, the instructions causing the apparatus to:

determine a characteristic of data communicated between a first device and the apparatus, wherein the first device is the UE or a device of the core network and the apparatus is the other of the UE or the device of the core network;

select, independent of the air interface, one of a common communication pathway and a unicast communication pathway between the device of the core network and the radio access node as a selected communication pathway based at least on the determined characteristic, wherein the common communication pathway comprises a secure common A10 connection which is securely shared by multiple devices, and further wherein the unicast communication pathway comprises a PDN connection/S1 tunnel or a PPP/Per-UE A10 connection which is uniquely assigned for communications between the first device and the second device;

transmit an indication of the selected communication pathway to the first device; and if the selected communication pathway has not been established:

establish the selected communication pathway between the first device and the apparatus; and communicate additional data via the selected communication pathway between the first device and the apparatus.

* * * * *